United States Patent
Noguchi et al.

(10) Patent No.: US 7,591,915 B2
(45) Date of Patent: *Sep. 22, 2009

(54) METAL MATERIAL AND METHOD OF PRODUCING THE SAME, AND CARBON FIBER-METAL COMPOSITE MATERIAL AND METHOD OF PRODUCING THE SAME

(75) Inventors: Toru Noguchi, Ueda (JP); Akira Magario, Nagano-ken (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 436 days.

This patent is subject to a terminal disclaimer.

(21) Appl. No.: 11/134,266

(22) Filed: May 23, 2005

(65) Prior Publication Data
US 2006/0016522 A1    Jan. 26, 2006

(30) Foreign Application Priority Data
May 24, 2004    (JP) ............................... 2004-153429

(51) Int. Cl.
  B22D 17/00    (2006.01)
  C08K 3/08    (2006.01)
  C08K 3/04    (2006.01)
(52) U.S. Cl. ..................... 148/538; 524/495; 524/439
(58) Field of Classification Search ................. 148/538; 524/495, 439
See application file for complete search history.

(56) References Cited

U.S. PATENT DOCUMENTS

| | | | |
|---|---|---|---|
| 3,595,054 A * | 7/1971 | Sendzimir | 72/190 |
| 4,889,774 A | 12/1989 | Fukizawa et al. | |
| 5,015,289 A | 5/1991 | Toda et al. | |
| 5,934,355 A | 8/1999 | Nakao et al. | |
| 7,252,135 B2 * | 8/2007 | Noguchi et al. | 164/97 |
| 2004/0241440 A1 | 12/2004 | Noguchi et al. | |
| 2005/0075443 A1* | 4/2005 | Noguchi et al. | 524/495 |
| 2006/0057386 A1* | 3/2006 | Magario et al. | 428/408 |
| 2006/0062986 A1 | 3/2006 | Magario et al. | |
| 2006/0079627 A1 | 4/2006 | Noguchi et al. | |
| 2007/0009725 A1* | 1/2007 | Noguchi et al. | 428/293.1 |

FOREIGN PATENT DOCUMENTS

JP    A-10-183269    7/1998
(Continued)

OTHER PUBLICATIONS

NPL-2: Li, Study on variation of structure and properties of natural rubber during accelerated storage, J. of Applied Polymer Scieces, vol. 70, pp. 1779-1783 (1998).*

(Continued)

Primary Examiner—Roy King
Assistant Examiner—Jie Yang
(74) Attorney, Agent, or Firm—Oliff & Berridge, PLC (57) ABSTRACT

A method of producing a metal material in which carbon nanofibers are dispersed around metal particles includes: (a) mixing an elastomer which includes an unsaturated bond or a group having affinity to the carbon nanofibers, the metal particles, and the carbon nanofibers, and dispersing the carbon nanofibers by applying a shear force to obtain a carbon fiber composite material; and (b) heat-treating the carbon fiber composite material to vaporize the elastomer in the carbon fiber composite material.

18 Claims, 3 Drawing Sheets

FOREIGN PATENT DOCUMENTS

WO      WO 03/060002 A1      7/2003

OTHER PUBLICATIONS

Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).

Magario et al., "Structure and Properties for Carbon Nanofiber/Alminium Nanocomposites," Oct. 11, 2003, 133d Collected Abstracts of the 2004 Autumn Meeting of The Japan Institute of Metals, pp. 566, (with English-language translation of relevant portions).

T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).

Noguchi et al., "Dynamic Properties for CNT/Al Nanocomposites," Mar. 30, 2004, 134th Collected Abstracts of the 2004 Spring Meeting of the Japan Institute of Metals, pp. 353, (with English-language translation of relevant portions).

Magario et al., "Structure and Thermal Properties for CNT/Al Nanocomposites," Mar. 30, 2004, 134th Collected Abstracts of the 2004 Spring Meeting of The Japan Institute of Metals, pp. 353, (with English-language translation of relevant portions).

Noguchi et al., "Preparation and Properties of Aluminum Nanocomposites by Matrix Substitution of Carbon Nanotube/Elastomer Composites," May 20, 2004, 71st The Society of Rubber Industry, Japan Annual Meeting, pp. 30, (with English-language translation of relevant portions).

Noguchi et al., "Development of Carbon Nanotubes/Aluminum Composites and Expectation as Lightweight Member," Aug. 1, 2004, Engineering Materials, vol. 52, No. 8, (with English-language translation of relevant portions).

Noguchi et al., "Thermal Expansion of CNT/Al Nanocomposites," Sep. 28, 2004, 135th Collected Abstracts of the 2004 Autumn Meeting of The Japan Institute of Metals, pp. 569, (with English-language translation of relevant portions).

U.S. Appl. No. 10/895,351, filed Jul. 21, 2004, Toru Noguchi et al.

* cited by examiner

PARTIAL ENLARGED VIEW

FIG. 3

METAL MATERIAL AND METHOD OF PRODUCING THE SAME, AND CARBON FIBER-METAL COMPOSITE MATERIAL AND METHOD OF PRODUCING THE SAME

Japanese Patent Application No. 2004-153429, filed on May 24, 2004, is hereby incorporated by reference in its entirety.

BACKGROUND OF THE INVENTION

The present invention relates to a metal material and a method of producing the same, and a carbon fiber-metal composite material and a method of producing the same.

In recent years, a composite material using carbon nanofibers has attracted attention. Such a composite material is expected to exhibit improved mechanical strength and the like due to inclusion of the carbon nanofibers.

As a casting method for a metal composite material, Japanese Patent Laid-Open No. 10-183269 proposes a casting method which causes magnesium vapor to permeate and become dispersed in a porous formed product formed of oxide ceramics while introducing nitrogen gas to cause a molten metal to permeate the porous formed product.

However, since the carbon nanofibers have strong aggregating properties, it is very difficult to uniformly disperse the carbon nanofibers in a matrix of a composite material. Therefore, it is difficult to obtain a carbon nanofiber composite material having desired properties. Moreover, expensive carbon nanofibers cannot be efficiently utilized.

Since the related-art casting method which causes a molten metal to permeate a porous formed product formed of oxide ceramics involves complicated processing, it is difficult to achieve production on an industrial scale.

SUMMARY

A first aspect of the invention relates to a method of producing a metal material in which carbon nanofibers are dispersed around metal particles, the method including:

(a) mixing an elastomer which includes an unsaturated bond or a group having affinity to the carbon nanofibers, the metal particles, and the carbon nanofibers, and dispersing the carbon nanofibers by applying a shear force to obtain a carbon fiber composite material; and (b) heat-treating the carbon fiber composite material to vaporize the elastomer in the carbon fiber composite material.

A second aspect of the invention relates to a method of producing a carbon fiber-metal composite material, the method including:

powder forming the metal material obtained by the above method.

A third aspect of the invention relates to a method of producing a carbon fiber-metal composite material, the method including:

mixing the metal material obtained by the above method into a molten metal and casting a mixture of the metal material and the molten metal in a die having a desired shape.

A fourth aspect of the invention relates to a method of producing a carbon fiber-metal composite material, the method including:

causing a molten metal to permeate the metal material obtained by the above method to fill a space in the metal material with the molten metal.

A fifth aspect of the invention relates to a metal material obtained by the above method.

A sixth aspect of the invention relates to a carbon fiber-metal composite material obtained by the above method.

DETAILED DESCRIPTION OF THE EMBODIMENT

The invention may provide a metal material in which carbon nanofibers are dispersed, and a method of producing the same. The invention may also provide a carbon fiber-metal composite material in which carbon nanofibers are uniformly dispersed, and a method of producing the same.

One embodiment of the invention provides a method of producing a metal material in which carbon nanofibers are dispersed around metal particles, the method including:

(a) mixing an elastomer which includes an unsaturated bond or a group having affinity to the carbon nanofibers, the metal particles, and the carbon nanofibers, and dispersing the carbon nanofibers by applying a shear force to obtain a carbon fiber composite material; and (b) heat-treating the carbon fiber composite material to vaporize the elastomer in the carbon fiber composite material.

According to the step (a) of the method in one embodiment of the invention, since the unsaturated bond or group of the elastomer bonds to an active site of the carbon nanofiber, particularly to a terminal radical of the carbon nanofiber, the aggregating force of the carbon nanofibers can be reduced, whereby dispersibility can be increased. Moreover, since free radicals formed in the elastomer shorn by the shear force attack the surfaces of the carbon nanofibers, the surfaces of the carbon nanofibers are activated. The use of the elastomer including the metal particles causes turbulent flows of the elastomer to occur around the metal particles when dispersing the carbon nanofibers by applying a shear force. These flows causes the carbon fiber composite material in one embodiment of the invention to have a configuration in which the carbon nanofibers are further uniformly dispersed in the elastomer as a matrix. In particular, even carbon nanofibers with a diameter of about 30 nm or less or carbon nanofibers in the shape of a curved fiber, which are difficult to be dispersed, can be uniformly dispersed in the elastomer.

According to the step (b) of the production method in one embodiment of the invention, the metal particles and the carbon nanofibers remain when vaporizing the elastomer by the heat treatment, whereby a metal material in which the carbon nanofibers are dispersed around the metal particles can be obtained. The metal material can be easily utilized for general metalworking such as casting.

The elastomer in one embodiment of the invention may be either a rubber elastomer or a thermoplastic elastomer. In the case of using the rubber elastomer, the elastomer may be either a crosslinked form or an uncrosslinked form. As the raw material elastomer, an uncrosslinked form is used when using the rubber elastomer.

The step (a) of dispersing the carbon nanofibers in the elastomer by applying a shear force may be carried out by using an open-roll method with a roll distance of 0.5 mm or less.

A method of producing a carbon fiber-metal composite material according to an embodiment of the invention uses the above metal material, and further includes a step (c) such as:

(c') powder forming the above metal material;

(c") mixing the above metal material into a molten metal and casting a mixture of the metal material and the molten metal in a die having a desired shape; or (c''') causing a molten metal to permeate the above metal material to fill a space in the metal material with the molten metal.

According to this method of producing a carbon fiber-metal composite material, a carbon fiber-metal composite material, in which the carbon nanofibers are uniformly dispersed, can be obtained by using the metal material in which the carbon nanofibers are dispersed as described above. According to this method, since the surfaces of the carbon nanofibers in the metal material are activated, the carbon nanofibers exhibit improved wettability with the metal material and have sufficient wettability with a molten metal of another metal material. Therefore, a homogenous carbon fiber-metal composite material of which the difference of the mechanical properties is decreased over the entire material is obtained.

Embodiments of the invention are described below in detail with reference to the drawings.

The elastomer preferably has characteristics such as a certain degree of molecular length and flexibility in addition to high affinity to the carbon nanofibers. In the step of dispersing the carbon nanofibers in the elastomer by applying a shear force, it is preferable that the carbon nanofibers and the elastomer be mixed at as high a shear force as possible.

(A) Elastomer

The elastomer has a molecular weight of preferably 5,000 to 5,000,000, and still more preferably 20,000 to 3,000,000. If the molecular weight of the elastomer is within this range, since the elastomer molecules are entangled and linked, the elastomer easily enters the space between the aggregated carbon nanofibers, whereby the effect of separating the carbon nanofibers is improved. If the molecular weight of the elastomer is less than 5,000, since the elastomer molecules cannot be sufficiently entangled, the effect of dispersing the carbon nanofibers is reduced even if a shear force is applied in the subsequent step. If the molecular weight of the elastomer is greater than 5,000,000, since the elastomer becomes too hard, the processing of the elastomer becomes difficult.

The network component of the elastomer in an uncrosslinked form has a spin-spin relaxation time ($T2n/30°$ C.) measured at 30° C. by a Hahn-echo method using a pulsed nuclear magnetic resonance (NMR) technique of preferably 100 to 3,000 μsec, and still more preferably 200 to 1,000 μsec. If the elastomer has a spin-spin relaxation time ($T2n/30°$ C.) within the above range, the elastomer is flexible and has sufficiently high molecular mobility. Therefore, when mixing the elastomer and the carbon nanofibers, the elastomer can easily enter the space between the carbon nanofibers due to high molecular mobility. If the spin-spin relaxation time ($T2n/30°$ C.) is shorter than 100 μsec, the elastomer cannot have sufficient molecular mobility. If the spin-spin relaxation time ($T2n/30°$ C.) is longer than 3,000 μsec, since the elastomer tends to flow as a liquid, it becomes difficult to disperse the carbon nanofibers.

The network component of the elastomer in a crosslinked form preferably has a spin-spin relaxation time ($T2n$), measured at 30° C. by the Hahn-echo method using the pulsed NMR technique, of 100 to 2,000 μsec. The reasons therefor are the same as those described for the uncrosslinked form. Specifically, when crosslinking an uncrosslinked form which satisfies the above conditions using the method of the invention, the spin-spin relaxation time ($T2n$) of the resulting crosslinked form almost falls within the above range.

The spin-spin relaxation time obtained by the Hahn-echo method using the pulsed NMR technique is a measure which indicates the molecular mobility of a substance. In more detail, when measuring the spin-spin relaxation time of the elastomer by the Hahn-echo method using the pulsed NMR technique, a first component having a shorter first spin-spin relaxation time ($T2n$) and a second component having a longer second spin-spin relaxation time ($T2nn$) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90-degree pulse method may be applied instead of the Hahn-echo method. However, since the elastomer according to the invention has a medium spin-spin relaxation time ($T2$), the Hahn-echo method is most suitable. In general, the solid-echo method and the 90-degree pulse method are suitable for measuring a short spin-spin relaxation time ($T2$), the Hahn-echo method is suitable for measuring a medium spin-spin relaxation time ($T2$), and the CPMG method is suitable for measuring a long spin-spin relaxation time ($T2$).

The elastomer includes an unsaturated bond or a group having affinity to the carbon nanofiber, particularly to a terminal radical of the carbon nanofiber, in at least one of the main chain, side chain, and terminal chain, or has properties of readily forming such a radical or group. The unsaturated bond or group may be at least one unsaturated bond or group selected from a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The carbon nanofiber generally has a structure in which the side surface is formed of a six-membered ring of carbon atoms and the end is closed by introduction of a five-membered ring. Since the carbon nanofiber has a forced structure, a defect tends to occur, whereby a radical or a functional group tends to be formed at the defect. In this embodiment, since the elastomer includes an unsaturated bond or a group having high affinity (reactivity or polarity) to the radical of the carbon nanofiber in at least one of the main chain, side chain, and terminal chain, the elastomer and the carbon nanofibers can be bonded. This enables the carbon nanofibers to be easily dispersed by overcoming the aggregating force of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), and polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), and styrene-based elastomer (SBS); or a mixture of these elastomers may be used. The studies conducted by the inventor of the invention have revealed that it is particularly difficult to disperse the carbon nanofibers in ethylene propylene rubber (EPR or EPDM).

(B) Metal Particle

The metal particles are used as a raw material for producing a metal composite material, and are mixed and dispersed in the elastomer in advance to cause the carbon nanofibers to be further uniformly dispersed when mixing the carbon nanofibers. As the metal particles, particles of aluminum and an aluminum alloy, magnesium and a magnesium alloy, titanium and a titanium alloy, iron and an iron alloy, and the like may be used either individually or in combination of two or more. The metal particles preferably have an average particle diameter greater than the average diameter of the carbon nanofibers used. The average particle diameter of the metal particles is 500 μm or less, and preferably 1 to 300 μm. The shape of the metal particles is not limited to spherical. The metal particles may be in the shape of a sheet or a scale insofar as turbulent flows occur around the metal particles during mixing.

(C) Carbon Nanofiber

The carbon nanofibers preferably have an average diameter of 0.5 to 500 nm. In order to increase the strength of the resulting carbon fiber composite material, the average diameter of the carbon nanofibers is still more preferably 0.5 to 30 nm. The carbon nanofibers may be in the shape of a linear fiber or a curved fiber.

The amount of the carbon nanofibers added is not particularly limited, and may be set depending on the application. The carbon fiber composite material in one embodiment of the invention may be directly used as an elastomer material in the form of a crosslinked elastomer, an uncrosslinked elastomer, or a thermoplastic polymer. The carbon fiber composite material in one embodiment of the invention may include the carbon nanofibers in an amount of 0.01 to 50 wt %. A metal material obtained by vaporizing the elastomer in the carbon fiber composite material may be used as a masterbatch as a carbon nanofiber source when mixing the carbon nanofibers into a metal as a matrix.

As examples of the carbon nanofibers, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of a single-layer structure or a multi-layer structure, or a single-layer structure and a multi-layer structure may be present in combination. A carbon material having a partial carbon nanotube structure may also be used. The carbon nanotube may be called a graphite fibril nanotube.

A single-layer carbon nanotube or a multi-layer carbon nanotube is produced to a desired size using an arc discharge method, a laser ablation method, a vapor-phase growth method, or the like.

In the arc discharge method, an arc is discharged between electrode materials made of carbon rods in an argon or hydrogen atmosphere at a pressure lower than atmospheric pressure to some extent to obtain a multi-layer carbon nanotube deposited on the cathode. When mixing a catalyst such as nickel/cobalt into the carbon rod and discharging an arc, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The carbon nanofibers may be provided with improved adhesion to and wettability with the elastomer by subjecting the carbon nanofibers to a surface treatment such as an ion-injection treatment, sputter-etching treatment, or plasma treatment before mixing the carbon nanofibers and the elastomer.

(D) Step (a) of Mixing Carbon Nanofibers into Elastomer and Dispersing Carbon Nanofibers by Applying Shear Force An example using an open-roll method with a roll distance of 0.5 mm or less in one embodiment of the invention is described below as a step of mixing the metal particles and the carbon nanofibers into the elastomer.

Figure 1:
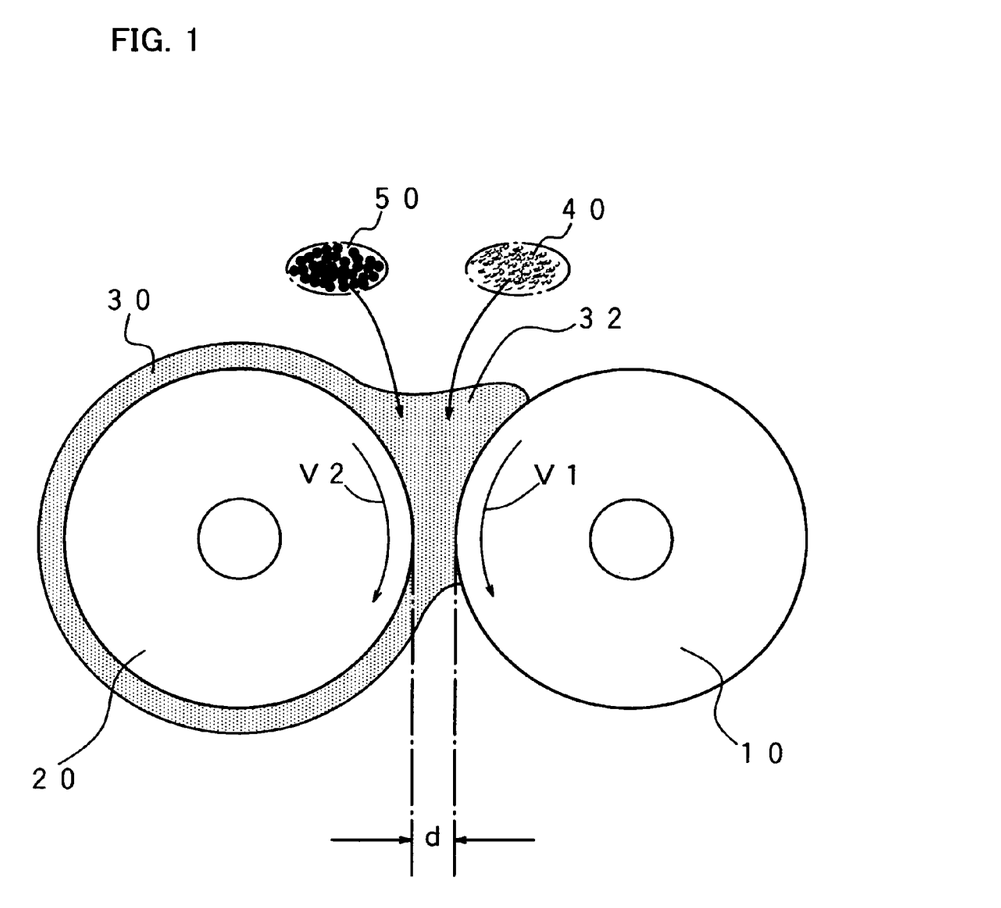
FIG. 1 schematically shows a mixing method for an elastomer and carbon nanofibers utilizing an open-roll method in one embodiment of the invention.

FIG. 1 is a diagram schematically showing the open-roll method using two rolls. In FIG. 1, a reference numeral 10 indicates a first roll, and a reference numeral 20 indicates a second roll. The first roll 10 and the second roll 20 are disposed at a predetermined distance "d" of preferably 1.0 mm or less, and still more preferably 0.1 to 0.5 mm. The first and second rolls are rotated normally or reversely. In the example shown in FIG. 1, the first roll 10 and the second roll 20 are rotated in the directions indicated by the arrows. When the surface velocity of the first roll 10 is indicated by V1 and the surface velocity of the second roll 20 is indicated by V2, the surface velocity ratio (V1/V2) of the first roll 10 to the second roll 20 is preferably 1.05 to 3.00, and still more preferably 1.05 to 1.2. A desired shear force can be obtained by using such a surface velocity ratio. When causing an elastomer 30 to be wound around the second roll 20 while rotating the first and second rolls, a bank 32 in which the elastomer is deposited between the rolls 10 and 20 is formed. The elastomer 30 and metal particles 50 are mixed by adding the metal particles 50 to the bank 32 and rotating the first and second rolls 10 and 20. After the addition of carbon nanofibers 40 to the bank 32 in which the elastomer 30 and the metal particles 50 are mixed, the first and second rolls 10 and 20 are rotated. After reducing the distance between the first and second rolls 10 and 20 to the distance "d", the first and second rolls 10 and 20 are rotated at a predetermined surface velocity ratio. This causes a high shear force to be applied to the elastomer 30, whereby the aggregated carbon nanofibers are separated by the shear force so that the carbon nanofibers are removed one by one and dispersed in the elastomer 30. The shear force caused by the rolls causes turbulent flows to occur around the metal particles dispersed in the elastomer. These complicated flows cause the carbon nanofibers to be further dispersed in the elastomer 30. If the elastomer 30 and the carbon nanofibers 40 are mixed before mixing the metal particles 50, since the movement of the elastomer 30 is restricted by the carbon nanofibers 40, it becomes difficult to mix the metal particles 50. Therefore, it is preferable to mix the metal particles 50 before adding the carbon nanofibers 40 to the elastomer 30.

In the step (a), free radicals are formed in the elastomer shorn by the shear force and attack the surfaces of the carbon nanofibers, whereby the surfaces of the carbon nanofibers are activated. When using natural rubber (NR) as the elastomer, each natural rubber (NR) molecule is cut while being mixed by the rolls to have a molecular weight lower than the molecular weight prior to being supplied to the open rolls. Since radicals are formed in the cut natural rubber (NR) molecules and attack the surfaces of the carbon nanofibers during mixing, the surfaces of the carbon nanofibers are activated. The activated carbon nanofibers bond to oxygen in atmosphere or the like to exhibit excellent wettability with aluminum of the metal particles.

In the step (a), the elastomer and the carbon nanofibers are mixed at a comparatively low temperature of preferably 0 to 50° C., and still more preferably 5 to 30° C. in order to obtain as high a shear force as possible. In the case of using the open-roll method, it is preferable to set the roll temperature at the above-mentioned temperature. The distance "d" between the first and second rolls 10 and 20 is set to be greater than the average particle diameter of the metal particles 50 even when the distance is minimized. This enables the carbon nanofibers 40 to be uniformly dispersed in the elastomer 30.

Since the elastomer in one embodiment of the invention has the above-described characteristics, specifically, the above-described molecular configuration (molecular length), molecular motion, and chemical interaction with the carbon nanofibers, the carbon nanofibers are easily dispersed. Therefore, a carbon fiber composite material exhibiting excellent dispersibility and dispersion stability (carbon nanofibers rarely reaggregate) can be obtained. In more detail, when mixing the elastomer and the carbon nanofibers, the elastomer having an appropriately long molecular length and high molecular mobility enters the space between the carbon nanofibers, and a specific portion of the elastomer bonds to a highly active site of the carbon nanofiber by chemical interaction. When a high shear force is applied to the mixture of the elastomer and the carbon nanofibers in this state, the carbon nanofibers move accompanying the movement of the elastomer, whereby the aggregated carbon nanofibers are separated and dispersed in the elastomer. The dispersed carbon nanofibers are prevented from reaggregating due to chemical interaction with the elastomer, whereby excellent dispersion stability can be obtained.

Since the metal particles are included in the elastomer in a predetermined amount, a shear force is also applied to separate the carbon nanofibers due to many complicated flows, such as turbulent flows, of the elastomer occurring around the metal particles. Therefore, even carbon nanofibers with a diameter of about 30 nm or less or carbon nanofibers in the shape of a curved fiber move in the flow direction of each elastomer molecule bonded with the carbon nanofibers due to chemical interaction, whereby the carbon nanofibers are uniformly dispersed in the elastomer.

In the step of dispersing the carbon nanofibers in the elastomer by applying a shear force, an internal mixing method or a multi-screw extrusion kneading method may be used instead of the open-roll method. In other words, it suffices that a shear force sufficient to separate the aggregated carbon nanofibers be applied to the elastomer.

A carbon fiber composite material obtained by the step of mixing and dispersing the metal particles and the carbon nanofibers in the elastomer (mixing and dispersion step) may be formed after crosslinking the material using a crosslinking agent, or may be formed without crosslinking the material. As the forming method, a compression forming process, an extrusion forming process, or the like may be used. The compression forming process includes forming the carbon fiber composite material, in which the metal particles and the carbon nanofibers are dispersed, in a pressurized state for a predetermined time (e.g. 20 min) in a die having a desired shape and set at a predetermined temperature (e.g. 175° C.).

In the mixing and dispersing step of the elastomer and the carbon nanofibers, or in the subsequent step, a compounding ingredient usually used in the processing of an elastomer such as rubber may be added. As the compounding ingredient, a known compounding ingredient may be used. As examples of the compounding ingredient, a crosslinking agent, vulcanizing agent, vulcanization accelerator, vulcanization retarder, softener, plasticizer, curing agent, reinforcing agent, filler, aging preventive, colorant, and the like can be given.

(E) Carbon Fiber Composite Material Obtained by Above-Described Method

In the carbon fiber composite material in one embodiment of the invention, the carbon nanofibers are uniformly dispersed in the elastomer as a matrix. In other words, the elastomer is restrained by the carbon nanofibers. The mobility of the elastomer molecules restrained by the carbon nanofibers is small in comparison with the case where the elastomer molecules are not restrained by the carbon nanofibers. Therefore, the first spin-spin relaxation time ($T2n$), the second spin-spin relaxation time ($T2nn$), and the spin-lattice relaxation time ($T1$) of the carbon fiber composite material according to one embodiment of the invention are shorter than those of an elastomer which does not include the carbon nanofibers. In particular, when mixing the carbon nanofibers into an elastomer including the metal particles, the second spin-spin relaxation time ($T2nn$) becomes shorter than that of an elastomer including only the carbon nanofibers. The spin-lattice relaxation time ($T1$) of the crosslinked form changes in proportion to the amount of the carbon nanofibers mixed.

The amount of non-network components (non-reticulate chain components) is considered to be reduced for the following reasons, in a state in which the elastomer molecules are restrained by the carbon nanofibers. Specifically, when the molecular mobility of the elastomer is entirely decreased by the carbon nanofibers, since the non-network component which cannot easily move is increased, the non-network components tend to behave in the same manner as the network components. Moreover, since the non-network components (terminal chains) easily move, the non-network components tend to be adsorbed on the active site of the carbon nanofibers. It is considered that these phenomena decrease the amount of non-network components. Therefore, the fraction (fnn) of components having the second spin-spin relaxation time becomes smaller than that of an elastomer which does not include the carbon nanofibers. In particular, when mixing the carbon nanofibers into the elastomer including the metal particles, the fraction (fnn) of components having the second spin-spin relaxation time is further reduced in comparison with the elastomer including only the carbon nanofibers.

Therefore, the carbon fiber composite material according to one embodiment of the invention preferably has values measured by the Hahn-echo method using the pulsed NMR technique within the following range.

Specifically, it is preferable that, in the uncrosslinked form, the first spin-spin relaxation time ($T2n$) measured at 150° C. be 100 to 3,000 μsec, the second spin-spin relaxation time ($T2nn$) measured at 150° C. be absent or 1,000 to 10,000 μsec, and the fraction (fnn) of components having the second spin-spin relaxation time be less than 0.2.

The spin-lattice relaxation time ($T1$) measured by the Hahn-echo method using the pulsed NMR technique is a measure which indicates the molecular mobility of a substance in the same manner as the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer.

The carbon fiber composite material according to one embodiment of the invention preferably has a flow temperature, determined by temperature dependence measurement of dynamic viscoelasticity, 20° C. or more higher than the flow temperature of the raw material elastomer. In the carbon fiber composite material in one embodiment of the invention, the metal particles and the carbon nanofibers are uniformly dispersed in the elastomer. In other words, the elastomer is restrained by the carbon nanofibers as described above. In this state, the elastomer exhibits molecular motion smaller than that of an elastomer which does not include the carbon nanofibers, whereby flowability is decreased. The carbon fiber composite material having such flow temperature characteristics shows a small temperature dependence of dynamic viscoelasticity to exhibit excellent thermal resistance.

The carbon nanofibers are generally entangled and dispersed in a medium to only a small extent. However, when using the metal material obtained by vaporizing the elastomer in the carbon fiber composite material in this embodiment as a raw material for a metal composite material, since the carbon nanofibers are present in the elastomer in a dispersed state, the carbon nanofibers can be easily dispersed in a medium by mixing the raw material and a medium such as a metal. Moreover, since the surfaces of the carbon nanofibers are activated, or the carbon nanofibers exhibit improved wettability with a metal due to the reaction with oxygen or the like, the carbon nanofibers exhibit excellent wettability with the metal of the metal composite material.

(F) Step (b) of Heat-Treating Carbon Fiber Composite Material to Produce Metal Material A metal material in which the carbon nanofibers are dispersed around the metal particles can be produced by (b) heat-treating the carbon fiber composite material to vaporize the elastomer in the carbon fiber composite material.

The heat treatment conditions may be arbitrarily selected depending on the type of the elastomer used. In the step (b), it is preferable that the carbon fiber composite material be heat-treated in an inert gas atmosphere at a temperature equal to or higher than the vaporization temperature of the elastomer but less than the melting point of the metal particles. As the inert gas, nitrogen, nitrogen containing 5% or less of oxygen, argon, or the like may be used. The inert gas atmosphere is used because the carbon nanofibers are oxidized and decomposed (combusted) if the heat treatment in the step (b) is performed in air.

The carbon fiber composite material is disposed in a heat treatment furnace containing an inert gas atmosphere, and heat-treated by heating the furnace to a temperature equal to or higher than the vaporization temperature of the elastomer. The elastomer is vaporized by this heating, whereby a metal material in which the carbon nanofibers are dispersed around the metal particles is obtained. When the heat treatment temperature is less than the melting point of the metal particles, since the metal particles are not melted and remain in the shape of a particle, the resulting metal material is in the form of a powder or a block which can be easily powdered, whereby the metal material is easily utilized in the subsequent processing.

For example, when the elastomer is natural rubber (NR) and the metal particles are aluminum particles, the heat treatment temperature in the step (b) is preferably set at 300 to 650° C. When the heat treatment temperature is 300° C. or more, the natural rubber is decomposed and vaporized. When the heat treatment temperature is 650° C. or less, the carbon fiber composite material is powdered without causing the aluminum particles to melt, whereby a powdered metal material can be obtained. The heat treatment time is reduced as the heat treatment temperature is increased. The heat treatment time is one minute to 100 hours in order to cause the elastomer to be decomposed and vaporized.

In the metal material thus obtained, the carbon nanofibers are dispersed between the metal particles. Since the carbon nanofibers have excellent wettability with the metal particles, the carbon nanofibers are dispersed around the metal particles in a state similar to the state in which the carbon nanofibers are dispersed in the elastomer.

(G) Step (c) of Obtaining Carbon Fiber-Metal Composite Material Using Metal Material In a step (c) in one embodiment of the invention, a carbon fiber-metal composite material in which the carbon nanofibers are dispersed in a metal material can be obtained by using the metal material obtained in the above-described embodiment.

In the step (c), various forming methods as described below may be employed.

Powder Forming Method

A powder forming step of the composite material in one embodiment of the invention may be performed by powder forming the metal material obtained by the step (b). In more detail, the metal material obtained in the above-described embodiment is compressed in a die either directly or after mixing with another metal material, and is sintered at the sintering temperature of the metal particles (e.g. 550° C. when the metal particles are aluminum particles) to obtain a carbon fiber-metal composite material.

The powder forming in one embodiment of the invention is the same as powder forming in a metal forming process, and includes powder metallurgy. The powder forming in one embodiment of the invention includes not only the case of using a powder raw material, but also the case of using a raw material formed in the shape of a block by compression preforming the composite elastomer. As the sintering method, a general sintering method, a spark plasma sintering (SPS) method using a plasma sintering device, or the like may be employed.

The metal material and particles of another metal material may be mixed by dry blending, wet blending, or the like. In the case of using wet blending, it is preferable to mix (wet-blend) the metal material with the particles of another metal material in a solvent. The metal material maintains the external shape of the carbon fiber composite material due to bonding between the metal particles. However, since the bonding force between the metal particles is small, the metal material can be easily ground. Therefore, since the metal material ground to particles can be used in dry blending or wet blending, the metal material is easily utilized for metalworking.

The carbon fiber-metal composite material produced by such powder forming is obtained in a state in which the carbon nanofibers are dispersed in the metal material as the matrix. The particles of another metal material used in the step (c) may be formed of a material either the same as or different from the material for the above metal particles. A carbon fiber-metal composite material having desired properties can be produced by adjusting the mixing ratio of the metal material and another metal particles.

Casting Method

A casting step of the carbon fiber-metal composite material may be performed by mixing the metal material obtained in the above-described embodiment into a molten metal, and casting the mixture in a die having a desired shape, for example. In the casting step, a metal mold casting method, a diecasting method, or a low-pressure casting method, in which a molten metal is poured into a die made of steel, may be employed. A method classified into a special casting method, such as a high-pressure casting method in which a molten metal is caused to solidify at a high pressure, a thixocasting method in which a molten metal is stirred, or a centrifugal casting method in which a molten metal is cast into a die utilizing centrifugal force, may also be employed. In these casting methods, a molten metal is caused to solidify in a die in a state in which the metal material is mixed into the molten metal to form a carbon fiber-metal composite material.

The molten metal used in the casting step may be appropriately selected from metals used in a general casting process, such as iron and an iron alloy, aluminum and an aluminum alloy, magnesium and a magnesium alloy, titanium and a titanium alloy, copper and a copper alloy, zinc and a zinc alloy, either individually or in combination of two or more, depending on the application. If the metal used as the molten metal is a metal the same as the metal particles mixed in advance into the metal material, or an alloy containing the same metal element as that of the metal particles, wettability with the metal particles is increased, whereby the strength of the carbon fiber-metal composite material as the resulting product can be increased. When using a molten metal formed of a material differing from the material for the metal particles, a carbon fiber-metal composite material having desired properties can be produced by adjusting the mixing ratio of the metal material (metal particles) to the molten metal.

Permeation Method

A casting step in one embodiment of the invention using a pressureless permeation method which causes a molten metal to permeate the metal material is described below in detail with reference to FIGS. 2 and 3.

Figure 2:
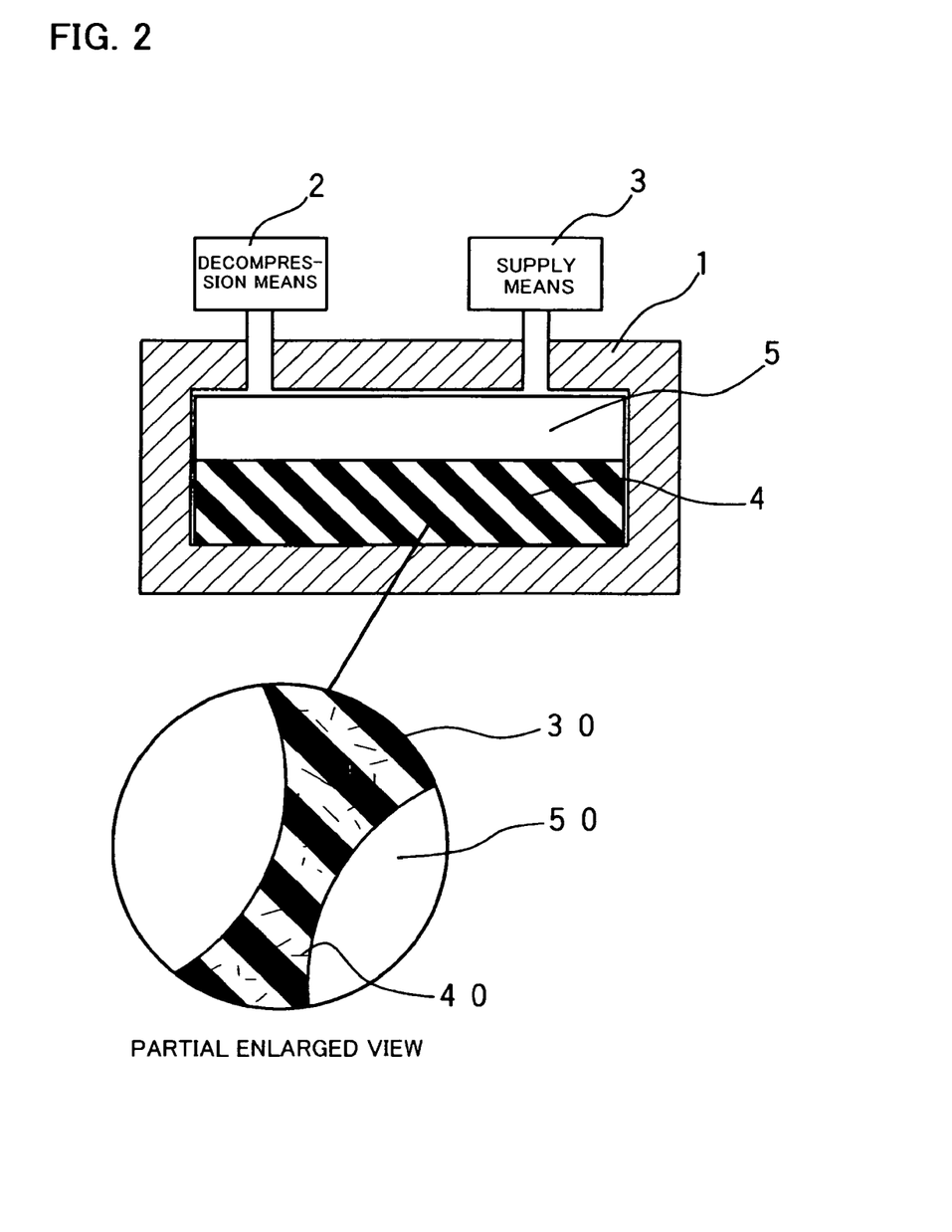
FIG. 2 is a schematic configuration diagram of a device for producing a carbon fiber-metal composite material by using a pressureless permeation method.
Figure 3:
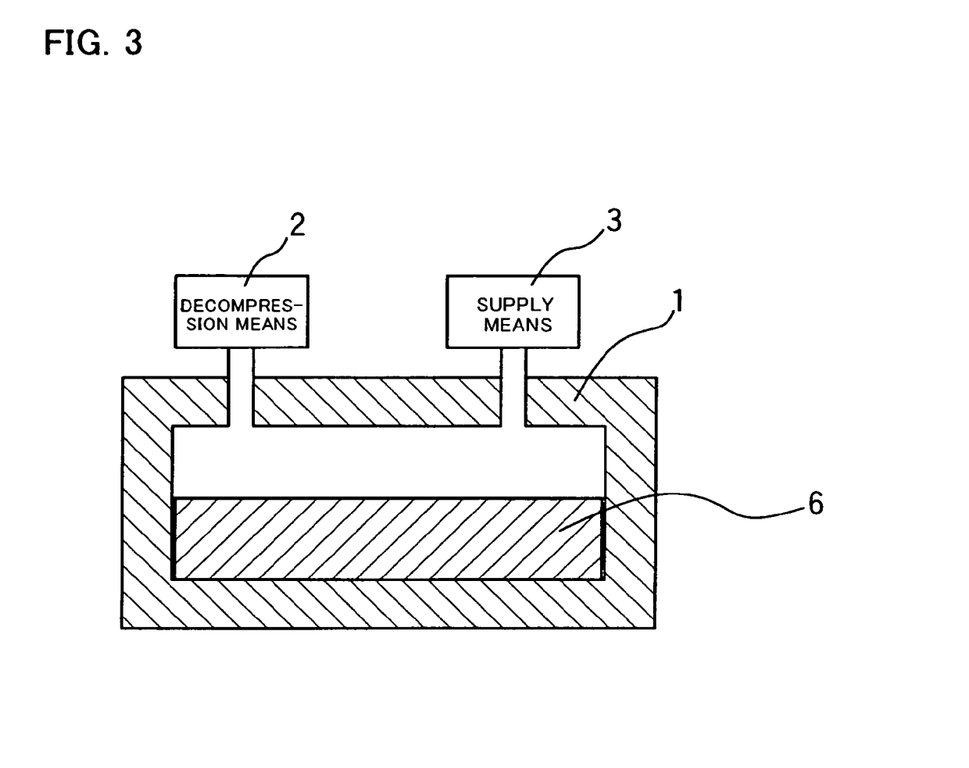
FIG. 3 is a schematic configuration diagram of a device for producing a carbon fiber-metal composite material by using a pressureless permeation method.

FIGS. 2 and 3 are schematic configuration diagrams of a device for producing a carbon fiber-metal composite material using the pressureless permeation method. As the metal material obtained in the above-described embodiment, a metal material 4 which is compression-preformed in a die having the shape of the final product may be used. In FIG. 2, the metal material 4 (e.g. aluminum particles 50 and carbon nanofibers 40) formed in advance is placed in a sealed container 1. An ingot of another metal material such as an aluminum ingot 5 is disposed on the metal material 4. The metal material 4 and the aluminum ingot 5 disposed in the container 1 are heated to a temperature equal to or higher than the melting point of aluminum using heating means (not shown) provided in the container 1. The heated aluminum ingot 5 is melted into an aluminum molten metal (molten metal). The aluminum molten metal permeates the space in the metal material 4.

The metal material 4 in one embodiment of the invention is formed to have a space which allows the aluminum molten metal to rapidly permeate the entire metal material 4 by a capillary phenomenon when compression preforming the metal material 4. The atmosphere inside the container 1 may be replaced with a reducing atmosphere by mixing magnesium particles into the particles of the metal material 4 before compression preforming. The aluminum molten metal permeates the space between the aluminum particles 50, which are reduced and provided with improved wettability, due to the capillary phenomenon, whereby the metal material is entirely filled with the aluminum molten metal. The heating using the heating means of the container 1 is terminated so that the molten metal which has permeated the metal material 4 is cooled and solidified to obtain a carbon fiber-metal composite material 6, as shown in FIG. 3, in which the carbon nanofibers 40 are uniformly dispersed. The metal material 4 used in the casting step is preferably formed in advance using metal particles of the same metal as the molten metal used in the casting step. This enables the molten metal and the metal particles to be easily mixed, whereby a homogeneous metal can be obtained. When the ingot of another metal material is formed of a material differing from the material for the metal particles, a carbon fiber-metal composite material having desired properties can be produced by adjusting the mixing ratio of the metal material (metal particles) to the molten metal.

The atmosphere inside the container 1 may be removed by decompression means 2 such as a vacuum pump connected with the container 1 before heating the container 1. Nitrogen gas may be introduced into the container 1 from inert-gas supply means 3 such as a nitrogen gas cylinder connected with the container 1.

In one embodiment of the invention, the metal material is compression preformed into a desired shape in advance. However, the permeation method may be performed by placing the metal material ground to particles in a die having a desired shape and placing an ingot of another metal material on the metal material.

The pressureless permeation method is described in the above-described embodiment. However, a pressure permeation method which applies pressure by utilizing the pressure of an atmosphere such as an inert gas may also be used.

As described above, since the surfaces of the carbon nanofibers in the metal material are activated, the carbon nanofibers exhibit improved wettability with the metal material and have sufficient wettability with a molten metal of another metal material. Therefore, a homogenous carbon fiber-metal composite material of which the variation of the mechanical properties is decreased over the entire material is obtained.

Examples of the invention and comparative examples are described below. However, the invention is not limited to the following examples.

EXAMPLES 1 TO 3 AND COMPARATIVE EXAMPLE 1

(1) Preparation of Sample (a) Preparation of Uncrosslinked Sample (Carbon Fiber Composite Material)

Step 1: Open rolls with a roll diameter of six inches (roll temperature: 10 to 20° C.) were provided with a predetermined amount (100 g) of a polymer substance (100 parts by weight (phr)) shown in Table 1, and the polymer substance was wound around the roll.

Step 2: Metal particles were added to the polymer substance in an amount (parts by weight) shown in Table 1. The roll distance was set at 1.5 mm. The type of the metal particles added is described later.

Step 3: Carbon nanofibers ("CNT" in Table 1) were added to the polymer substance including the metal particles in an amount (parts by weight) shown in Table 1. The roll distance was set at 1.5 mm.

Step 4: After the addition of the carbon nanofibers, the mixture of the polymer substance and the carbon nanofibers was removed from the rolls.

Step 5: After reducing the roll distance from 1.5 mm to 0.3 mm, the mixture was supplied and tight milled. The surface velocity ratio of the two rolls was set at 1.1. The tight milling was repeatedly performed ten times.

Step 6: After setting the rolls at a predetermined distance (1.1 mm), the mixture subjected to tight milling was supplied and sheeted.

Uncrosslinked samples of Examples 1 to 3 and Comparative Example 1 were thus obtained.

(b) Preparation of Metal Material

The uncrosslinked samples (carbon fiber composite materials) of Examples 1 to 3 obtained by (a) were heat-treated for two hours in a furnace containing a nitrogen atmosphere at a temperature equal to or higher than the vaporization temperature of the elastomer (500° C.) to vaporize the elastomer to obtain powdered metal materials.

(c) Preparation of Carbon Fiber-Metal Composite Material

The metal materials of Examples 1 to 3 obtained by (b) were plasma sintered to obtain carbon fiber-metal composite materials. In Examples 2 and 3, low-melting-point aluminum alloy particles in an amount shown in Table 1 were mixed with the metal material obtained by (b) before plasma sintering. In more detail, a mixture obtained by mixing the metal material obtained by (b) and low-melting-point 10 aluminum alloy particles was disposed in a die placed in a vacuum container. After compressing the mixture from the top and the bottom by applying a compressive stress of about 50 MPa to a punch as a load P, a pulse-like current was caused to flow through the mixture via the punch. The pulsed current caused the punch and the die to generate heat to sinter the particulate mixture to obtain a carbon fiber-metal composite material. The amount of each component was adjusted so that the content of the carbon nanofibers in the resulting carbon fiber-metal composite material was 1.6 vol %.

As the low-melting-point aluminum alloy particles, aluminum alloy particles having a melting point of 550° C. and an average particle diameter of 50 μm were used.

A carbon fiber-metal composite material of Comparative Example 1 was obtained using the pressureless permeation method. In more detail, the uncrosslinked sample of Comparative Example 1 obtained by (a) was disposed in a container (furnace). After placing an aluminum ingot (metal) on the uncrosslinked sample, the sample and the aluminum ingot were heated to the melting point of aluminum in an inert gas (nitrogen) atmosphere. The aluminum ingot melted into an aluminum molten metal, and the molten metal permeated the sample and replace the elastomer in the composite material. After completion of permeation of the aluminum molten metal, the aluminum molten metal was allowed to cool and solidify to obtain a carbon fiber-metal composite material of Comparative Example 1.

As the metal particles of Examples 1 to 3 and Comparative Example 1, aluminum particles (average particle diameter: 28 μm) were used. As the carbon nanofibers, carbon nanofibers having an average diameter (fiber diameter) of about 13 nm and an average length of 25 μm were used.

(2) Measurement Using Pulsed NMR Technique

Each uncrosslinked sample was subjected to measurement by the Hahn-echo method using the pulsed NMR technique. The measurement was conducted using "JMN-MU25" manufactured by JEOL, Ltd. The measurement was conducted under conditions of an observing nucleus of $^1H$, a resonance frequency of 25 MHz, and a 90-degree pulse width of 2 μsec, and a decay curve was determined while changing Pi in the pulse sequence (90°x-Pi-180°x) of the Hahn-echo method. The sample was measured in a state in which the sample was inserted into a sample tube within an appropriate magnetic field range. The measurement temperature was 150° C. The first spin-spin relaxation time ($T2n$), the second spin-spin relaxation time ($T2nn$), and the fraction (fnn) of components having the second spin-spin relaxation time were determined for the raw material elastomer and the uncrosslinked sample of the composite material. The first spin-spin relaxation time ($T2n$) of the raw material elastomer was also determined at a measurement temperature of 30° C. The measurement results are shown in Table 1. The first spin-spin relaxation time ($T2n$) of the uncrosslinked sample of Example 1 was 1,780 (μsec), the first spin-spin relaxation time ($T2n$) of the uncrosslinked sample of Example 2 was 1,640 (μsec), and the first spin-spin relaxation time ($T2n$) of the uncrosslinked sample of Example 3 was 1,540 (μsec). The second spin-spin relaxation time ($T2nn$) was not detected in Examples 1 to 3. Therefore, the fraction (fnn) of components having the second spin-spin relaxation time was zero.

(3) Measurement of Flow Temperature

The flow temperature of the raw material elastomer and the uncrosslinked samples was determined by dynamic viscoelasticity measurement (JIS K 6394). In more detail, the flow temperature was determined by applying sine vibration (±0.1% or less) to the sample having a width of 5 mm, a length of 40 mm, and a thickness of 1 mm, and measuring the stress and phase difference δ generated by applying the sine vibration. The temperature was changed from −70° C. to 150° C. at a temperature rise rate of 2° C./min. The results are shown in Table 1. In Table 1, the case where the flow phenomenon of the sample was not observed up to 150° C. was indicated as "150° C. or higher".

(4) Observation Using Electron Microscope (SEM)

Table 1 shows electron microscope (SEM) observation results for the carbon fiber-metal composite material samples of Examples 1 to 3 and Comparative Example 1.

(5) Measurement of Compressive Yield Strength

The compressive yield strength (MPa) of the carbon fiber-metal composite material sample was measured. The 0.2% yield strength (σ0.2) when compressing the sample with dimensions of 10×10×5 mm at 0.01 mm/min was measured as the compressive yield strength. The results are shown in Table 1.

TABLE 1

|  |  | Example 1 | Example 2 | Example 3 | Comparative Example 1 |
|---|---|---|---|---|---|
| Raw material elastomer | Polymer substance | NR | NR | NR | NR |
|  | Polar group | Double bond | Double bond | Double bond | Double bond |
|  | Average molecular weight | 3,000,000 | 3,000,000 | 3,000,000 | 3,000,000 |
|  | T2n (30° C.) (μsec) | 700 | 700 | 700 | 700 |

TABLE 1-continued

|  |  | Example 1 | Example 2 | Example 3 | Comparative Example 1 |
|---|---|---|---|---|---|
|  | T2n (150° C.) (µsec) | 5500 | 5500 | 5500 | 5500 |
|  | T2nn (150° C.) (µsec) | 18000 | 18000 | 18000 | 18000 |
|  | fnn (150° C.) | 0.381 | 0.381 | 0.381 | 0.381 |
|  | Flow temperature (° C.) | 40 | 40 | 40 | 40 |
| Mixing ratio | Polymer (phr) | 100 | 100 | 100 | 100 |
|  | Al particles (phr) | 500 | 500 | 500 | 500 |
|  | CNT (phr) | 7 | 10 | 12.5 | 10 |
| Carbon fiber composite material (uncrosslinked sample) | Flow temperature (° C.) | 150° C. or higher | 150° C. or higher | 150° C. or higher | 150° C. or higher |
|  | T2n (150° C.) (µsec) | 1780 | 1640 | 1540 | 1640 |
|  | T2nn (150° C.) (µsec) | — | — | — | — |
|  | fnn (150° C.) | 0 | 0 | 0 | 0 |
| Mixing ratio at sintering | Metal material (vol %) | 100 | 63 | 50 | — |
|  | Low-melting-point aluminum particles (vol %) | 0 | 37 | 50 | — |
| Carbon fiber-metal composite material (matrix:aluminum) | CNT dispersion state (SEM observation) | Good | Good | Good | Good |
|  | Specific gravity | 2.49 | 2.61 | 2.63 | 2.41 |
|  | Maximum value of compressive yield strength (MPa) | 435 | 535 | 550 | 435 |
|  | Minimum value of compressive yield strength (MPa) | 375 | 490 | 505 | 255 |
|  | Mean value of compressive yield strength (MPa) | 400 | 510 | 520 | 350 |

From the results shown in Table 1, the following items were confirmed according to Examples 1 to 3 of the invention. Specifically, the spin-spin relaxation times at 150° C. (T2n/150° C. and T2nn/150° C.) of the uncrosslinked sample (carbon fiber composite material) including the metal particles and the carbon nanofibers are shorter than those of the raw material elastomer which does not include the metal particles and the carbon nanofibers. The fraction (fnn/150° C.) of the uncrosslinked sample (carbon fiber composite material) including the metal particles and the carbon nanofibers is smaller than that of the raw material elastomer which does not include the metal particles and the carbon nanofibers. These results suggest that the carbon nanofibers are uniformly dispersed in the carbon fiber composite material according to the example.

Since the flow temperature of the carbon fiber composite material (uncrosslinked sample) including the metal particles and the carbon nanofibers is 20° C. or more higher than that of the raw material elastomer, it is understood that the carbon fiber composite material has a small temperature dependence of dynamic viscoelasticity and exhibits excellent thermal resistance.

As a result of electron microscope (SEM) observation of the dispersion state of the carbon fiber-metal composite materials (aluminum matrix) of Examples 1 to 3 and Comparative Example 1, aggregation of the carbon nanofibers was observed to only a small extent.

Since the minimum value of the compressive yield strength of the carbon fiber-metal composite material samples of Examples 1 to 3 is greater than the minimum value of the compressive yield strength of the carbon fiber-metal composite material sample of Comparative Example 1, it was found that a homogeneous carbon fiber-metal composite material of which the variation of the mechanical properties is reduced over the entire material was obtained. Since the specific gravity of the carbon fiber-metal composite material samples of Examples 1 to 3 is greater than the specific gravity of the carbon fiber-metal composite material sample of Comparative Example 1, it was confirmed that an entirely homogeneous carbon fiber-metal composite material was obtained.

From these results, according to the invention, it was confirmed that the carbon nanofibers, which can be generally dispersed in a matrix to only a small extent, can be uniformly dispersed in the elastomer. Moreover, it was confirmed that even thin carbon nanofibers with a diameter of 30 nm or less or carbon nanofibers which are easily curved and entangled can be sufficiently dispersed by mixing the metal particles into the elastomer. Furthermore, it was confirmed that a carbon fiber-metal composite material in which the carbon nanofibers are dispersed and which exhibits uniform mechanical properties is obtained by using the metal material obtained by vaporizing the elastomer as the raw material for the metal composite material.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method of producing a metal material in which carbon nanofibers are uniformly dispersed around metal particles, the method comprising:

(a) mixing an elastomer which includes an unsaturated bond or a group having affinity to the carbon nanofibers, the metal particles, and the carbon nanofibers, and dispersing the carbon nanofibers by applying a shear force to obtain a carbon fiber composite material; and (b) heat-treating the carbon fiber composite material to vaporize the elastomer in the carbon fiber composite material at a temperature that is equal to or higher than a vaporization temperature of the elastomer and less than a melting point of the metal particles to obtain the metal material.

2. The method of producing a metal material as defined in claim 1,
wherein the metal particles are mixed in an amount of 10 to 3,000 parts by weight for 100 parts by weight of the elastomer.

3. The method of producing a metal material as defined in claim 1, wherein the metal particles have an average particle diameter greater than an average diameter of the carbon nanofibers.

4. The method of producing a metal material as defined in claim 1, wherein the metal particles have an average particle diameter of 500 μm or less.

5. The method of producing a metal material as defined in claim 1, wherein the metal particles are aluminum particles or aluminum alloy particles.

6. The method of producing a metal material as defined in claim 1, wherein the elastomer has a molecular weight of 5,000 to 5,000,000.

7. The method of producing a metal material as defined in claim 1,
wherein at least one of a main chain, a side chain, and a terminal chain of the elastomer includes at least one of a double bond, a triple bond, α-hydrogen, a carbonyl group, a carboxyl group, a hydroxyl group, an amino group, a nitrite group, a ketone group, an amide group, an epoxy group, an ester group, a vinyl group, a halogen group, a urethane group, a biuret group, an allophanate group, and a urea group.

8. The method of producing a metal material as defined in claim 1, wherein a network component of the elastomer in an uncrosslinked form has a spin-spin relaxation time ($T2n$) measured at 30° C. by a Hahn-echo method using a pulsed nuclear magnetic resonance (NMR) technique of 100 to 3000 μsec.

9. The method of producing a metal material as defined in claim 1, wherein a network component of the elastomer in a crosslinked form has a spin-spin relaxation time ($T2n$) measured at 30° C. by a Hahn-echo method using a pulsed nuclear magnetic resonance (NMR) technique of 100 to 2000 μsec.

10. The method of producing a metal material as defined in claim 1,
wherein the carbon nanofibers have an average diameter of 0.5 to 500 nm.

11. The method of producing a metal material as defined in claim 1,
wherein the step (a) is performed by using an open roll method with a roll interval of 0.5 mm or less.

12. The method of producing a metal material as defined in claim 11,
wherein two rolls used in the open-roll method have a surface velocity ratio of 1.05 to 3.00.

13. The method of producing a metal material as defined in claim 1, wherein the step (a) is performed at 0 to 50° C.

14. The method of producing a metal material as defined in claim 1,
wherein the step (b) is performed in an inert gas atmosphere at a temperature equal to or higher than a vaporization temperature of the elastomer and less than a melting point of the metal particles.

15. The method of producing a metal material as defined in claim 1,
wherein the elastomer is natural rubber (NR);
wherein the metal particles are aluminum particles; and
wherein a heat treatment temperature in the step (b) is 300 to 650° C.

16. A method of producing a carbon fiber-metal composite material, the method comprising:
powder forming the metal material obtained in claim 1.

17. A method of producing a carbon fiber-metal composite material, the method comprising:
mixing the metal material obtained in claim 1 into a molten metal and casting a mixture of the metal material and the molten metal in a die having a desired shape.

18. A method of producing a carbon fiber-metal composite material, the method comprising:
causing a molten metal to permeate the metal material obtained in claim 1 to fill a space in the metal material with the molten metal.

* * * * *